United States Patent
Gorbaty

(10) Patent No.: US 8,849,873 B2
(45) Date of Patent: Sep. 30, 2014

(54) SPECIFICATIONS AUTOMATION SYSTEM AND METHOD

(75) Inventor: Leon Gorbaty, Spring, TX (US)

(73) Assignee: Bentley Systems, Incorporated, Exton, PA (US)

(*) Notice: Subject to any disclaimer, the term of this patent is extended or adjusted under 35 U.S.C. 154(b) by 0 days.

(21) Appl. No.: 12/661,507

(22) Filed: Mar. 18, 2010

(65) Prior Publication Data

US 2011/0289120 A1 Nov. 24, 2011

Related U.S. Application Data

(60) Provisional application No. 61/161,093, filed on Mar. 18, 2009.

(51) Int. Cl.
G06F 17/30 (2006.01)
G06F 17/24 (2006.01)
G06F 17/22 (2006.01)
G06Q 10/06 (2012.01)
G06Q 10/10 (2012.01)

(52) U.S. Cl.
CPC .......... *G06F 17/241* (2013.01); *G06F 17/2247* (2013.01); *G06F 17/2229* (2013.01); *G06Q 10/06* (2013.01); *G06Q 10/10* (2013.01); *Y10S 707/956* (2013.01)
USPC ............................. 707/805; 707/956; 719/318

(58) Field of Classification Search
CPC .................... G06F 17/30286; G06F 17/30554; G06Q 10/10
USPC ..................... 707/805, 999.102, 956; 719/318
See application file for complete search history.

(56) References Cited

U.S. PATENT DOCUMENTS

| | | | | |
|---|---|---|---|---|
| 5,596,350 A | * | 1/1997 | Capps et al. ................. | 345/173 |
| 6,405,211 B1 | * | 6/2002 | Sokol et al. .................. | 707/754 |
| 6,546,397 B1 | * | 4/2003 | Rempell ........................... | 1/1 |
| 6,874,121 B1 | * | 3/2005 | Mayer .......................... | 715/205 |
| 6,904,562 B1 | * | 6/2005 | Hind et al. .................... | 715/239 |
| 6,976,213 B1 | * | 12/2005 | Letourneau et al. .......... | 715/234 |
| 7,039,859 B1 | * | 5/2006 | Sundaresan ................... | 715/229 |
| 7,594,168 B2 | * | 9/2009 | Rempell ....................... | 715/234 |
| 7,756,819 B2 | * | 7/2010 | Jang et al. ........................ | 1/1 |
| 7,954,048 B2 | * | 5/2011 | Gauthier et al. .............. | 715/229 |
| 8,122,428 B2 | * | 2/2012 | Dharmagadda ............... | 717/104 |
| 8,321,241 B1 | * | 11/2012 | Mansour et al. ................ | 705/3 |
| 2002/0065848 A1 | * | 5/2002 | Walker et al. ................ | 707/511 |

(Continued)

OTHER PUBLICATIONS

Wilson Cooke website, Spec Builder—Streamlining Project Specifications, "Spec Construction Tool | Specification Software—Spec Builder" 2 pages, accessed online at <http://www.specificationbuilder.co.uk/> on May 27, 2014.*

(Continued)

*Primary Examiner* — Phuong Thao Cao
(74) *Attorney, Agent, or Firm* — Cesari and McKenna, LLP

(57) ABSTRACT

A method of leveraging XML (eXtensible Markup Language) Technology, or similar modeling languages such as ontology definition languages, to provide attribution and multi-node data modeling, object orientation, classes, and linkage capabilities of such languages and technologies, specifically for authoring new and translating existing technical specifications in such a way that the base text content is augmented with additional information such as metadata, in such a way that other sub-specifications, data sheets, inspection and quality assurance documents, etc., do not need to be written separately, but instead become logical sub-components of the governing specifications themselves.

11 Claims, 4 Drawing Sheets

(56) References Cited

U.S. PATENT DOCUMENTS

| | | | |
|---|---|---|---|
| 2002/0087551 A1* | 7/2002 | Hickey et al. | 707/10 |
| 2002/0089169 A1* | 7/2002 | Johnson et al. | 283/45 |
| 2002/0128994 A1* | 9/2002 | Sadhasivan et al. | 707/1 |
| 2003/0041077 A1* | 2/2003 | Davis et al. | 707/500 |
| 2003/0074419 A1* | 4/2003 | VanderDrift | 709/218 |
| 2004/0024662 A1* | 2/2004 | Gray et al. | 705/29 |
| 2004/0148307 A1* | 7/2004 | Rempell | 707/102 |
| 2004/0220815 A1* | 11/2004 | Belanger et al. | 705/1 |
| 2004/0268304 A1* | 12/2004 | Kuo et al. | 717/109 |
| 2005/0097462 A1* | 5/2005 | Lumera et al. | 715/522 |
| 2005/0131714 A1* | 6/2005 | Braunstein et al. | 705/1 |
| 2005/0260974 A1* | 11/2005 | Lee et al. | 455/412.2 |
| 2005/0262130 A1* | 11/2005 | Mohan | 707/102 |
| 2006/0004738 A1* | 1/2006 | Blackwell et al. | 707/4 |
| 2006/0069986 A1* | 3/2006 | Sandoval | 715/517 |
| 2006/0117294 A1* | 6/2006 | Vogler | 717/104 |
| 2006/0123337 A1* | 6/2006 | Koinuma | 715/530 |
| 2006/0149770 A1* | 7/2006 | Jang et al. | 707/101 |
| 2006/0155782 A1* | 7/2006 | Berstis et al. | 707/203 |
| 2006/0206512 A1* | 9/2006 | Hanrahan et al. | 707/102 |
| 2006/0206523 A1* | 9/2006 | Gaurav et al. | 707/104.1 |
| 2006/0253490 A1* | 11/2006 | Krishna et al. | 707/104.1 |
| 2007/0035403 A1* | 2/2007 | Krishna et al. | 340/573.1 |
| 2007/0067336 A1* | 3/2007 | Horany | 707/102 |
| 2007/0079236 A1* | 4/2007 | Schrier et al. | 715/517 |
| 2007/0186157 A1* | 8/2007 | Walker et al. | 715/530 |
| 2008/0005138 A1* | 1/2008 | Gauthier et al. | 707/101 |
| 2008/0046254 A1* | 2/2008 | Nuno et al. | 705/1 |
| 2008/0189313 A1* | 8/2008 | Heinkel et al. | 707/102 |
| 2008/0215957 A1* | 9/2008 | Rapp et al. | 715/200 |
| 2008/0228671 A1* | 9/2008 | Nagaraj | 705/500 |
| 2008/0282148 A1* | 11/2008 | Xu | 715/249 |
| 2009/0007058 A1* | 1/2009 | Dharmagadda | 717/104 |
| 2009/0043824 A1* | 2/2009 | Claghorn | 707/200 |
| 2009/0125546 A1* | 5/2009 | Iborra et al. | 707/102 |
| 2009/0204421 A1* | 8/2009 | Guimaraes | 705/2 |
| 2009/0248443 A1* | 10/2009 | Kelly et al. | 705/3 |
| 2010/0010968 A1* | 1/2010 | Redlich et al. | 707/3 |
| 2010/0070930 A1* | 3/2010 | Thibault | 715/854 |

OTHER PUBLICATIONS

Wilson Cooke website, Spec Builder—Streamlining Project Specifications, "About Spec Builder—The Spec Construction Tool", 3 pages, accessed online at <http://www.specificationbuilder.co.uk/specbuilder.php> on May 27, 2014.*

* cited by examiner

```
= <epc.VirtItem KeyWord="102 Preliminary Dimension & Outline Drawing" Guid="e4615ddd-4c19-46ee-a708-
    62de79e4aac1" CreationDateTime="633522638689551483" DateTime="633522637707326267"
    Reminder="315506275200000000000" ObjectVersion = "0" PreviousVersion = "null" NextVersion = "null" MiscPath = ""
    ContainerPath="C:\EPC\PIP\PIP_RESR001_RefrigerationSystems.xml" Checked="True" ParentGuid="652cb78c-
    e694-49ad-8c7b-171cfc227a47" Number="" Status="NotRecieved" PkgNo="" ctrlNo="" WeeksARO="0"
    RefDate="633522637707326267">
    <Children />
= <LinkedObjects>
    <epc.InnerSpecLink Guid="c63501ee-21ff-4793-9e0a-b5d7efddba76" Obj1Guid="46977cc6-edd1-427c-b409-
    99bbafbd61ce" Obj1DebugString="\PIP_RESR001_RefrigerationSystems\Packaged, Skid-Mounted Industrial Process
    Refrigeration Systems Specification, February 2008\ VIRF\215 Valve List 46977cc6-edd1-427c-b409-99bbafbd61ce"
    Obj2Guid="e4615ddd-4c19-46ee-a708-62de79e4aac1"
    Obj2DebugString="\PIP_RESR001_RefrigerationSystems\Packaged, Skid-Mounted Industrial Process Refrigeration
    Systems Specification, February 2008\ VIRF\102 Preliminary Dimension & Outline Drawing e4615ddd-4c19-46ee-
    a708-62de79e4aac1"/>
    <epc.InnerSpecLink Guid="ea1911ca-4642-448d-8224-456a42f32cf0" Obj1Guid="43ff836-2fb3-4e94-9bca-807cf7fa1472"
    Obj1DebugString="\PIP_RESR001_RefrigerationSystems\Packaged, Skid-Mounted Industrial Process Refrigeration
    Systems Specification, February 2008\ VIRF\214 Schematic Wiring Diagram 43ff836-2fb3-4e94-9bca-807cf7fa1472"
    Obj2Guid="e4615ddd-4c19-46ee-a708-62de79e4aac1"
    Obj2 DebugString ="\ PIP_RESR001_RefrigerationSystems \Packaged, Skid-Mounted Industrial Process Refrigeration
    Systems Specification, February 2008\ VIRF\102 Preliminary Dimension & Outline Drawing e4615ddd-4c19-
    46ea708-62de79e4aac1"/>.
    <epc.InnerSpecLink Guid="23212d4e-4fec-4558-b934-5dac3dlacec3" Obj1Guid="fa673feb-5775-4736-ab99-
    676f4ee8e659" Obj1DebugString="\PIP_RESR001_RefrigerationSystems\Packaged, Skid-Mounted Industrial Process
    Refrigeration Systems Specification, February 2008\ VIRF\211 Piping Drawings fa673feb-5775-4736-ab99-
    676f4ee8e659" Obj2Guid="e4615ddd-4c19-46ee-a708-62de79e4aac1"
    Obj2DebugString="\PIP_RESR001_RefrigerationSystems\Packaged, Skid-Mounted Industrial Process Refrigeration
    Systems Specification, February 2008\ VIRF\102 Preliminary Dimension & Outline Drawing e4615ddd-4c19-46eea
    708-62de79e4aac1"/>
```

FIG. 2

```xml
= <epc.SpecItem KeyWord="3.5.1.2 Exchangers shall be arranged such that maintenance space for tube" Guid="3b44fdf2-b7ff-426f-9ec6-7a25b392db3c" CreationDateTime="63351S343169827529" DateTime="63351S343000000000" Reminder="315506275200000000000" ObjectVersion = "0" PreviousVersion = "null" NextVersion = "null" MiscPath = "" ContainerPath="C:\EPC\PIP\PIP_RESR001_RefrigerationSystems.xml" Checked="True" ParentGuid="b6b9ca60-2ccc-49c7-ab9b-17417bba0149" Number="3.5.1.2" Mark="True" Data="False" BidTab="True" Virf="False" Insp="False" YesNoIndeterminate="Indeterminate" ClauseName="" Images="" ClauseValue="" AdderDeductComment="" DecisionRequired="False">
=   <Children />
    <LinkedObjects>
      <epc.InnerSpecLink Guid="7514c74d-ed16-4709-920d-952f8167643f" Obj1Guid="3b44fdf2-b7ff-426f-9ec6-7a25b392db3c" Obj1DebugString="\PIP_RESR001_RefrigerationSystems\Packaged, Skid-Mounted Industrial Process Refrigeration Systems Specification, February 2008\3 Requirements\3.5 Heat Exchangers\3.5.1 General\3.5.1.2 Exchangers shall be arranged such that maintenance space for tube 3b44fdf2-b7ff-426f-9ec6-7a25b392db3c" Obj2Guid="e4615ddd-4c19-46ee-a708-62de79e4aac1" Obj2DebugString="\PIP_RESR001_RefrigerationSystems\Packaged, Skid-Mounted Industrial Process Refrigeration Systems Specification, February 2008\ VIRF\102 Preliminary Dimension & Outline Drawing e4615ddd-4c19-46ee-a708-62de79e4aac1" />
      <epc.InnerSpecLink Guid="f3bb898b-0c8d-454c-aaa4-3e24f3180c23" Obj1Guid="3b44fdf2-b7ff-426f-9ec6-7a25b392db3c" Obj1DebugString=" \ PIP_RESR001_RefrigerationSystems \Packaged, Skid-Mounted Industrial Process Refrigeration Systems Specification, February 2008\3 Requirements\3.5 Heat Exchangers\3.5.1 General\3.5.1.2 Exchangers shall be arranged such that maintenance space for tube 3b44fdf2-b7ff-426f-9ec6-7a25b392db3c" Obj2Guid="6fbb3f94-6ebd-4250-a5db-3fbf6614f19a" Obj2DebugString="\PIP_RESR001_RefrigerationSystems\Packaged, Skid-Mounted Industrial Process Refrigeration Systems Specification, February 2008\ VIRF\202 Dimension & Outline Drawing 6fbb3f94-6ebd-4250-a5db-3fbf6614f19a" />
      <epc.InnerSpecLink Guid="0f097dcc-8cbb-4655-bc31-d78d2b2b3c7e" Obj1Guid="3b44fdf2-b7ff-426f-9ec6-7a25b392db3c" Obj1DebugString=" \ PIP_RESR001_RefrigerationSystems \ Packaged, Skid-Mounted Industrial Process Refrigeration Systems Specification, February 2008\3 Requirements\3.5 Heat Exchangers\3.5.1 General\3.5.1.2 Exchangers shall be arranged such that maintenance space for tube 3b44fdf2-b7ff-426f-9ec6-7a25b392db3c" Obj2Guid="6704dfb6-9bd4-486a-8b80-8e7bd77379a9" Obj2DebugString =" \PIP_RES_R001_RefrigerationSystems \ Packaged, Skid-Mounted Industrial Process Refrigeration Systems Specification, February 2008\ VIRF\203 Space for Exchanger Tube Pulling and Cleaning 6704dfb6-9bd4-486a-8b80-8e7bd77379a9" />
```

SPECIFICATIONS AUTOMATION SYSTEM AND METHOD

CROSS REFERENCE TO RELATED APPLICATION

This application claims the benefit of U.S. provisional application No. 61/161,093 filed on Mar. 18, 2009, which is incorporated herein by reference as if fully set forth.

BACKGROUND

Technical specifications or engineering specifications used in various industries are static documents, typically produced using a word processor. These documents contain numerous references to codes, standards and other specifications. They also contain references to other kinds of documents that are intimately related, such as equipment datasheets, inspection and test requirements, bills of material, and other engineering, procurement, and project management documents. In many cases the main engineering specifications are the governing documents, while the information on other closely related specifications and other intimately related documents becomes out-of-spec because they are treated as separate documents.

It would be desirable if related, similar, and repeated information shared among several documents be electronically tied to the governing specifications. More particularly, it would be desirable if the information was not duplicated at all-that duplicated or related information reside only in the master specifications. More particularly yet, it would be desirable if the various related documents were not additional standalone documents at all, but instead, were alternative views and printouts from metadata contained in the master specifications themselves.

SUMMARY

The invention relates to a method of leveraging XML (eXtensible Markup Language) technology, and/or similar modeling languages such as ontology definition languages, OWL, RDL, HTML, and others, and more particularly, the attribution and multi-node data modeling, object orientation, classes, and linkage capabilities of such languages and technologies, specifically for the purpose authoring new, and translating existing specifications in such a way that the base textual content is augmented with additional information (aka metadata) in such a way that other sub-specifications, datasheets, inspection and quality assurance documents, etc. do not need to be written separately, but instead become logical sub-components of the governing specifications themselves.

Furthermore, this invention relates to the design and development of computer software and user interface, and configuration files that enable the application of said method.

For the above cited reasons it is an object of the invention to provide both a data model and computer software to enable engineers and other professionals and responsibilities to "multi task", that is, create several documents for various purposes and workflows and business requirements from a single editing session.

For the data model, for each specification paragraph, in addition to the main textual component, the appropriate attributes and/or elements are created and defined by schema to support said multitasking and the storing of related information for related purposes.

For the computer program and user interface, the ability for the user to write the main textual components of the specification while having simultaneously in view the content of the various metadata, as necessary, and being able to edit all at the same time.

Applicable to both data model and user interface, is the automatic linking and electronic management of the relationships of each paragraph and its metadata, as well as the ability to publish the main spec and it's related sub-specifications and/or documents automatically.

BRIEF DESCRIPTION OF THE DRAWINGS

FIGS. 1A and 1B together show an application window;

FIGS. 2 and 3 show sample XML (or other data modeling language) that stores text and related metadata, manages links, and provides for the programmatic extraction and automatic generation of the various views and documents.

DETAILED DESCRIPTION OF THE PREFERRED EMBODIMENT

The invention provides a system for automation of specifications that allows for the uniform creation and/or loading of information used in forming technical specifications into an automated and indexed data model, preferably using an XML spec schema and XML conventions or other similar modeling technologies such as ontology definition language(s), OWL, RDL, etc. This enables the technical specifications, specifications, codes and/or standards being utilized to be converted into electronic data that is in a standardized form based on the schema provided. The model allows specific information to be tagged and/or coded into specific fields so that they can be easily drawn from the Specification, referenced or updated in a uniform manner. Additionally, specific information and/or requirements can be tagged in or on spec paragraphs allowing these items to be separately drawn from and/or indexed in the technical specifications. For example, all inspection and test criteria requirements, codes, standards, etc. can be tagged so that they can be easily accessed, drawn from the technical specification and/or indexed separately.

Figure 1A:
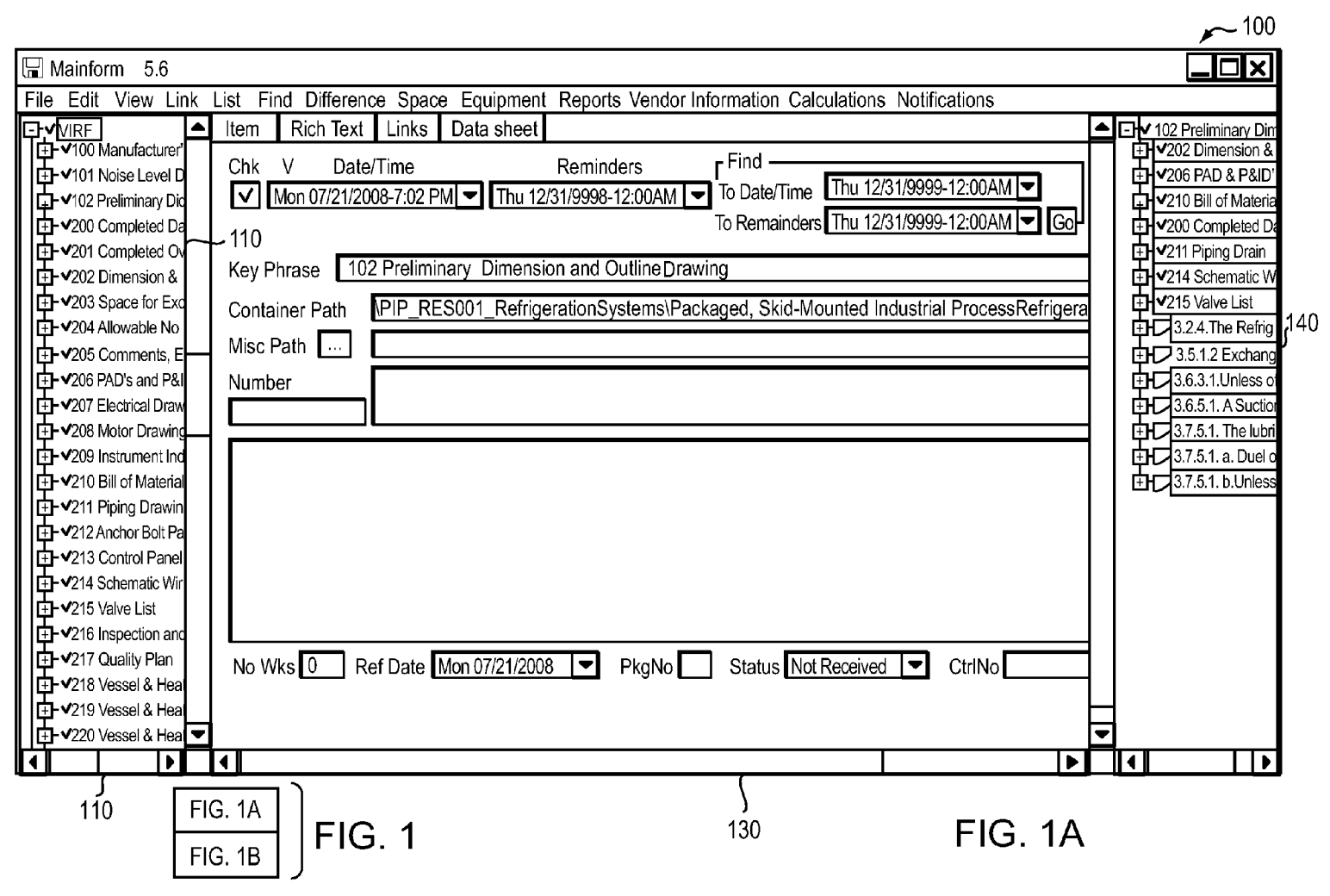
Figure 1B:
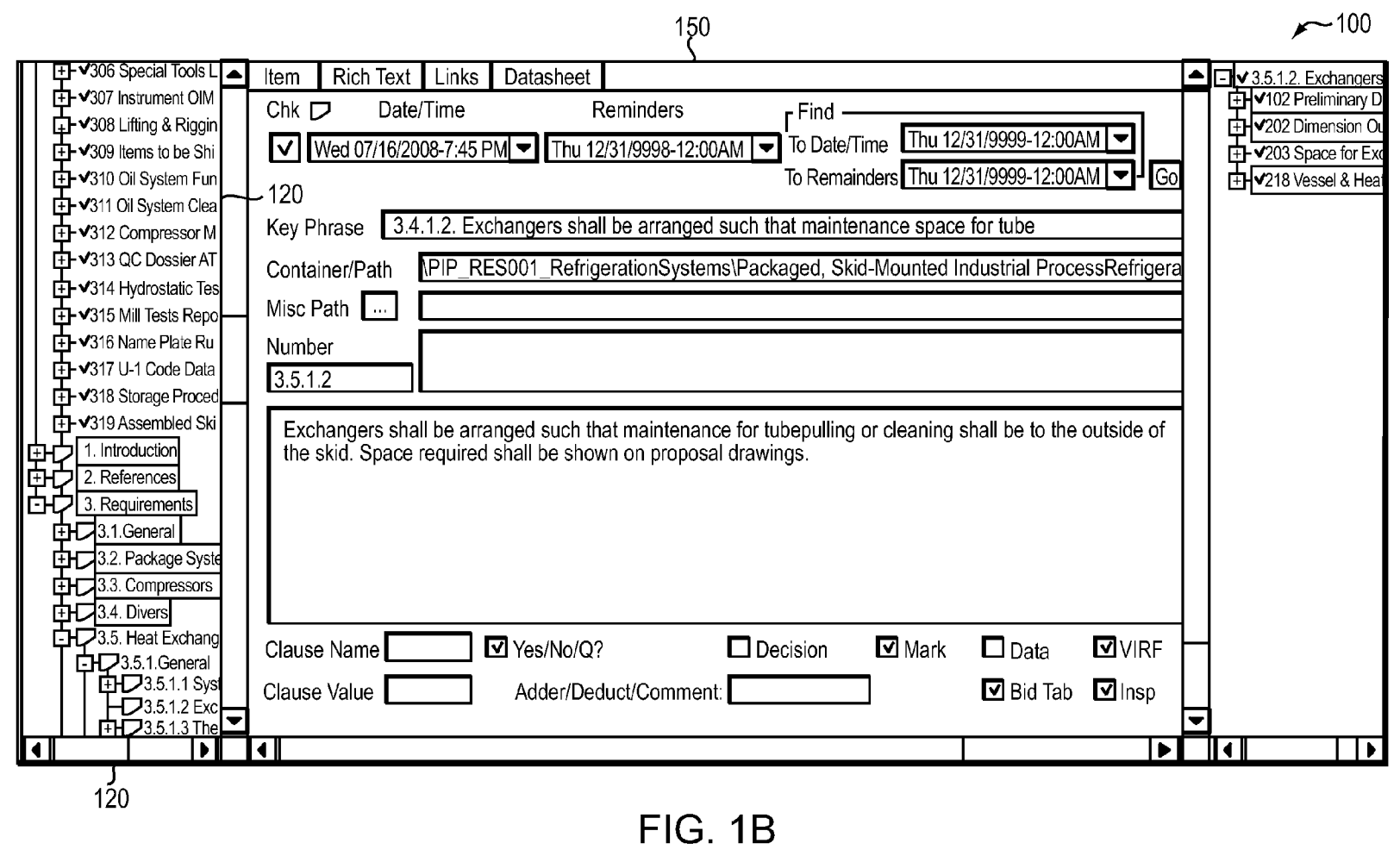

FIGS. 1A and 1B together show an application window 100 that in the top-left pane 110 shows a set Vendor Information Requirements Forms (VIRF) that is part of a refrigeration system specification.

The specification itself, in browse-able tree view is shown in the bottom left pane 120.

The top center pane 130 shows an individual vendor information requirement item. It has a field for the main text, but also shows user input fields for the various metadata, such as "PkgNo" (Package Number), "Status", "CtrlNo" (Control Number), "Date/Time", "Keyword", "Reminder", and so on. This information, collectively for all similar items in the subject XML files, is sufficient to generate a full Vendor Information Requirements package.

The top right pane 140 shows other items and main specification paragraphs that are electronically linked to the VIRF item. These relationships are managed automatically and all changes to any interrelated item propagates through all of them.

The bottom center pane 150 shows one of the main specification paragraphs including it's various metadata. Specifically, note checkboxes named "Data", "VIRF", "Bid Tab" (Bid Tabulation), and "Insp" (Inspection). These checkboxes mark (or un-mark) the paragraph as a provider (or non-provider) of some or all of this additional data. When the user hovers over these checkboxes she can add additional information for each requirement. In this example, the user can specify "Exchanger Arrangement", while simultaneously specifying which drawings this shall be shown on, and simultaneously generating an inspection checklist that will allow a quality assurance engineer to access the appropriate drawing, automatically with the appropriate specification paragraph, to verify these "Exchanger Arrangement" at a supplier's works after manufacture. The invention relates to a method of accomplishing all of this directly from the main paragraphs' interfaces, and not sequentially created multiple documents that can later become dis-synchronized, as it is done today.

FIGS. 2 and 3 show sample XML 200 (or other data modeling language) that stores text and related metadata, manages links, and provides for the programmatic extraction and automatic generation of the various views and documents, which are internally just one electronic document, therefore everything that is related is automatically maintained together and never becomes dis-synchronized.

The system is implemented utilizing a PC or other computer processor programmed with the specific method according to the invention.

The system is implemented such that various documents and concepts that are derivative of the main specification, called "Child Documents", live as flags or attributes on main specification paragraph objects, so that they are not stand alone documents and never become dis-synchronized from the main specification. These Child Documents are therefore not separately created, and can be generated while working on the main technical specification. The Child Documents can be attachments, subsidiaries, lists and various other documents and concepts that this environment considers as subsets of technical codes and standards. This list includes, but is not limited to, datasheets, inspection and test plans, and requirements, information requirements (e.g., vendor information requirements), etc. Child Documents can be generated from content in the main specification. Content in the main specification may be marked and/or tagged in the computer application either directly (i.e., in the main body text), or indirectly, i.e. tags and/or additional information are associated with specific paragraphs of the main specification.

The system further provides for "Item Level Granularity" for revision and history control. This can be implemented by a GUID (Globally Unique Identifier) or a URI (Universal Resource Identifier) or URL (Universal Resource Locator). This enables objects to be uniquely identified in the system and disassociate the objects from the paragraph number and other user attributes, so that if the main specification is renumbered in the future, paragraph-level revision and history are not lost. Item Level granularity can be implemented by maintaining an archive xml document backing each main xml document that maintains all 'stale' objects.

Further, the system provides discipline-specific views, functionalities and workflows. These are externally configurable by a configuration file, and thus do not require the recompilation of the product.

The system also has the functionality of providing reminders. That is, there is the ability of any object or entity in the main specification to record a reminder. These reminders have due dates as well as the ability to "snooze."

What is claimed is:

1. A method of automatically generating specification data models, said method comprising the steps of:
  parsing, by a hardware-based computer processor, existing documents or beginning a new blank document in lieu of an existing document;
  creating, by the hardware-based computer processor, a main specification that includes a plurality of main specification paragraphs, wherein the main specification is maintained by main specification paragraph objects that are uniquely identified with item level granularity, and the main specification paragraph objects are disassociated from any paragraph numbers of the main specification paragraphs;
  allowing a user to edit a main specification paragraph and metadata in simultaneous views;
  allowing the user to select relationships between the main specification paragraph and at least some of the metadata, and set notifications;
  allowing the user to configure output document types and publishing requirements;
  creating, by the hardware-based computer processor, Child Documents with the metadata related to the main specification paragraph, the Child Documents existing as logical sub-components of the main specification that reside internal to the main specification, and are indicated by flags or attributes on main specification paragraphs; and
  publishing the main specification and one or more of the Child Documents simultaneously.

2. The method of claim 1, wherein the item level granularity is implemented by a GUID (Globally Unique Identifier) or a URI (Universal Resource Identifier) or a URL (Universal Resource Locator).

3. The method of claim 1, wherein the item level granularity is implemented by maintaining an archive eXtensible Markup Language (XML) document backing the main specification that maintains all stale objects.

4. The method of claim 1, further comprising allowing a user to set reminders associated with any object or entity in the main specification.

5. The method of claim 4, further comprising recording a due date for a reminder and providing a snooze capability for the reminder.

6. A system comprising:
  a hardware-based computer processor;
  computer software executable by the hardware-based computer processor, the computer software configured to:
    create a main specification that includes a plurality of main specification paragraphs, wherein the main specification is maintained by objects that are uniquely identified with item level granularity and the objects are disassociated from any paragraph number of paragraphs in the main specification;
    show a main specification paragraph and metadata in simultaneous views to a user;
    receive a selection from the user of relationships between the main specification paragraph and at least some of the metadata;
    create Child Documents with the metadata related to the main specification paragraph, the Child Documents existing as logical sub-components of the main specification that reside internal to the main specification in association with the main specification paragraph; and
    publish the main specification and one or more of the Child Documents.

7. The system of claim 6, wherein the computer software is further configured to:
  mark the main specification paragraph to indicate that the main specification paragraph is a provider of the at least some of the metadata and a non-provider of other metadata.

8. The system of claim 6, wherein the Child Documents include sub-specifications, datasheets or inspection and quality assurance documents.

9. The system of claim 6, wherein the item level granularity is implemented by a GUID (Globally Unique Identifier) or a URI (Universal Resource Identifier) or a URL (Universal Resource Locator).

10. The system of claim 6, wherein the item level granularity is implemented using an archive eXtensible Markup Language (XML) document backing the main specification.

11. A method comprising:

creating, by a hardware-based computer processor, a main specification that includes a plurality of main specification paragraphs;

maintaining the main specification with main specification paragraph objects that are uniquely identified with item level granularity, wherein the main specification paragraph objects are disassociated from any paragraph numbers of the main specification paragraphs, such that information is preserved through any paragraph renumbering;

showing a main specification paragraph and metadata in simultaneous views to a user;

receiving a selection from the user of relationships between the main specification paragraph and at least some of the metadata, the selection to include marking the main specification paragraph to indicate the main specification paragraph is a provider of the at least some of the metadata and a non-provider of other metadata;

creating, by the hardware-based computer processor, Child Documents with the metadata associated with the main specification paragraph, the Child Documents existing as logical sub-components of the main specification that reside internal to the main specification in association with the main specification paragraph; and publishing the main specification and one or more of the Child Documents.

\* \* \* \* \*